Sept. 1, 1953      F. LEUCHS ET AL      2,650,943
ELECTRODE OF CARBON
Filed Jan. 12, 1951      3 Sheets-Sheet 1
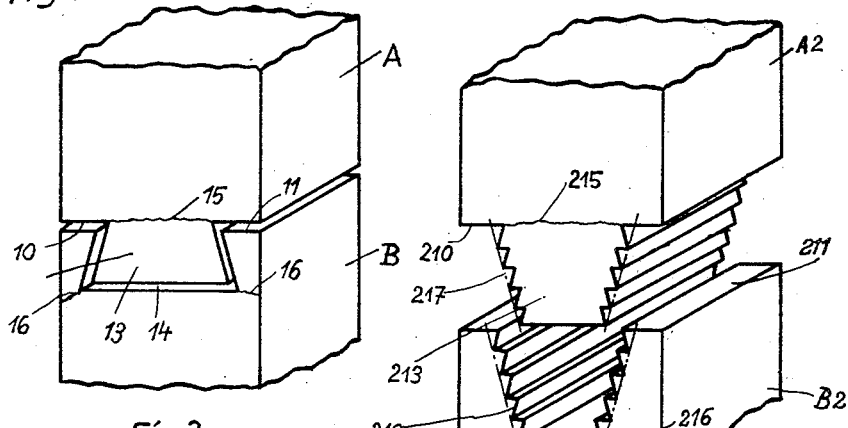
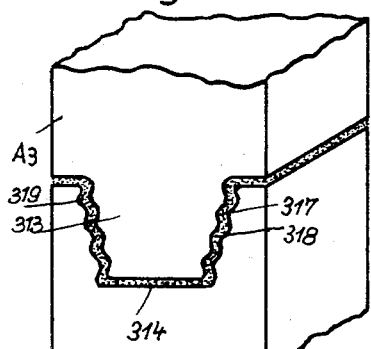
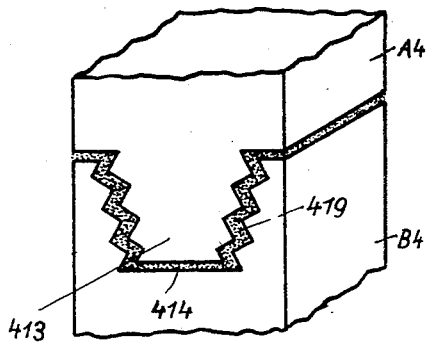
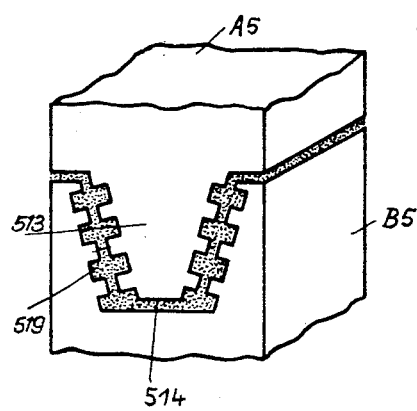
Inventors
Friedrich Leuchs +
Hans Zöllner
By Young, Emery & Thompson
Attys

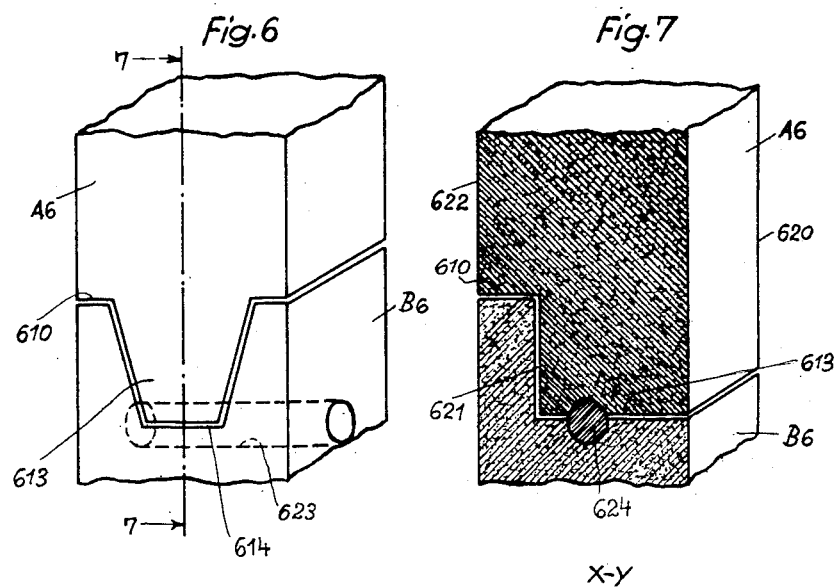

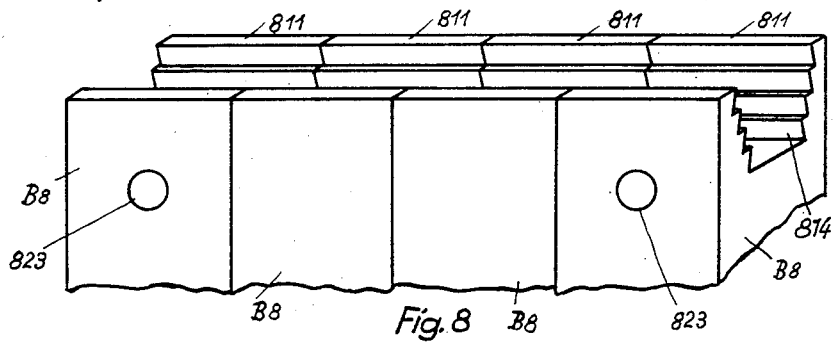
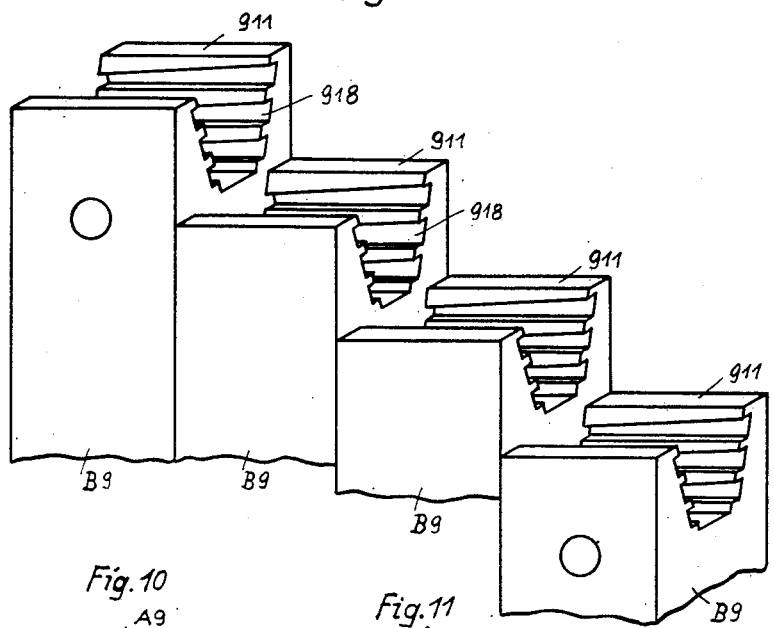
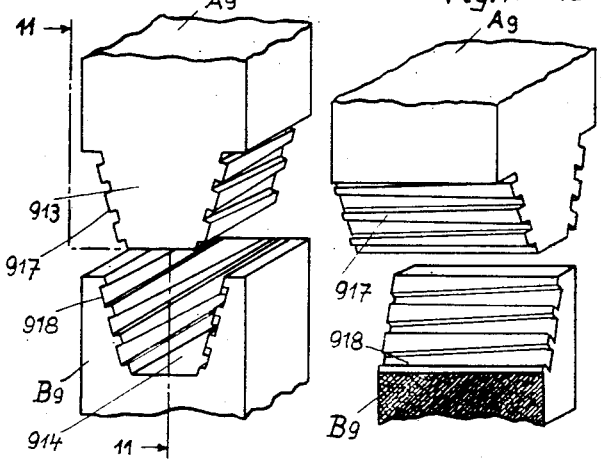

Patented Sept. 1, 1953

2,650,943

UNITED STATES PATENT OFFICE 2,650,943

ELECTRODE OF CARBON

Friedrich Leuchs and Hans Zöllner, Rothenbach (Pegnitz), Germany, assignors to C. Conradty, Nurnberg, Germany Application January 12, 1951, Serial No. 205,628
In Germany January 3, 1950

4 Claims. (Cl. 13—18)

The present invention relates to an electrode of carbon, e. g. of graphite, composed of two or more members, such electrodes being used for electrical ovens, for instance.

Where the electrode has a circular cross-section, it is customary to join successive sections of the electrode to each other by a threaded connection. This applies particularly to electrodes used in the continuous operation of an electric oven, a new section being fitted to the rear end of the electrode whenever the latter must be lengthened to compensate for the burning of the front end thereof, each section being thus completely consumed. The threaded connection of the electrode sections offers the great advantage of an economical electrode consumption.

It is an object of the present invention to provide an electrode composed of cubical members or sections capable of being conveniently and reliably joined to each other thereby lending itself to an operation similar to the one practiced heretofore with electrodes of a circular cross-section.

More specifically, it is an object of our invention to provide an electrode composed of cubical members of carbon which are fitted to each other by means which will securely connect such cubical section with their side faces in truly aligned relationship.

Obviously a threaded connection is not suitable for such purpose because cubical members, when joined by a threaded connection, can never be so set that their side faces are truly aligned. In practice either the threaded connection will remain loose resulting in a poor electrical contact and in a consequent local overheating and internal tensions or, when the connection is tightened, the side faces of the cubical electrode sections will get out of alignment. The problem involved is particularly difficult where a plurality of cubical electrodes constitutes a battery which is to be extended axially by joining new sections to the electrodes. In this event, the mutual interference of the sections prevents any rotation thereof, thus excluding the possibility of using a threaded connection.

The problem underlying the present invention, therefore, is to provide a convenient and reliable connection of two or more cubical members of carbon irrespective of whether the electrodes so shaped are to be arranged individually or in batteries, it being a requirement that the means for interconnecting the electrode members should reduce the mechanical strength of both of said members as little as possible and that the contacting faces serving to conduct the electrical current from one member to the other should have as large an area as possible, thereby securing a high electrical conductivity of the joint of both members.

According to the present invention, two electrode members to be joined have outer confining faces partly or entirely of truncated-triangular or wedge shape, one or more of such confining faces being provided with ridges or grooves of serrated, stepped, sawtooth-shaped or similar profile, such ridges or grooves being co-extensive with said confining faces or extending over a part thereof.

Thus one of the two members to be joined has a tapering projection engaging a conforming recess or groove of the other member, the lateral faces of said projection and of said groove being formed with serrations extending lengthwise and having a stepped or sawtooth profile. The serrations of the projection may either interlock with the serrations of the groove, thereby constituting a positive connection between the two members or they may be positioned in opposed spaced relationship, the space between them being filled with a suitable binder or cement. Such cement must be capable of setting in order to constitute an interconnecting element between the two electrode members. Where the joint between the two carbon members is subject to mechanical stresses only, as distinguished from electrical stresses, as is the case where the carbon members are employed as constructional units for lining chemical apparatus, any cement having the required mechanical property will do. In cases, however, where the joined carbon members are to conduct an electric current as electrodes, the cement must be highly conductive also. Where the joint is subject to powerful mechanical stresses, it has been found necessary to so shape the projection provided on the one member and the co-ordinated recess provided on the other member as to provide for a mutual interlocking relationship adapted to prevent a relative sliding motion transversely to the joined members. With such arrangement provisions are preferably made that will not or not substantially weaken the connecting elements. Therefore, interlocking means located at the joint of the two members are preferably partly provided in one of the two members and partly in the other one of the two members.

In order to more clearly explain the present invention, a number of embodiments thereof are more or less diagrammatically illustrated in the accompanying drawings which, however, are not intended to exhaustively disclose all possible modifications of the present invention.

In the drawings:

Fig. 1 is a perspective partial view of two cubical electrode members joined to one another by means similar to, but differing in a material respect from the invention.

Fig. 2 is an exploded view similar to that of Fig. 1 of two electrodes provided with the improved connecting means according to the present invention.

Fig. 3 is a partial elevation of two electrode members or sections joined by means constituting another embodiment of the present invention.

Fig. 4 is a partial elevation of an electrode slightly differing from that of Fig. 3 and constituting a third embodiment of the present invention.

Fig. 5 depicts a fifth embodiment of the invention.

Fig. 6 shows an elevation of a sixth embodiment of the present invention.

Fig. 7 is the section taken along line 7—7 of Fig. 6.

Fig. 8 is a perspective view of a battery of the novel electrode members of the kind illustrated in Fig. 4 having their ends arranged in aligned relationship.

Fig. 9 is a perspective view of a battery of electrode members of the kind illustrated in Fig. 4 having their ends arranged in a staggered relationship.

Fig. 10 is an end view of one of the electrodes shown in Fig. 9 and of a mate electrode member adapted to be joined thereto.

Fig. 11 is a side view of the pair of electrodes shown in Fig. 10, partly in section along line 11—11 of Fig. 10.

Fig. 1 illustrates an electrode comprising a pair of cubical members A and B of carbon, more particularly of electrode members having a square cross-section, means being provided for connecting the two members A and B to one another. As will appear from Fig. 1, the end face 10 of the member A is opposed to and substantially abuts the end face 11 of the member B, the space therebetween being shown on an exaggerated scale in Fig. 1 for sake of a clearer illustration. The means for connecting the members A and B comprise a transverse groove 14 provided in the end face 11 and a transverse projection 13 on the end face 10. The projection 13 has preferably the same profile throughout its length. The same is true with respect to the groove 14 provided in the end face 11. Moreover, the projection 13 and the groove 14 are adapted for slidable engagement transversely of the longitudinal axis of the members A and B. Similar considerations apply to the pair of electrode members illustrated in Figs. 2, 3, 4, and 5. However, it will appear from Fig. 1 that the projection 13 has its smallest width near its base, as indicated by the arrow 15, whereas it has its greatest width at its top. As a result, member B is liable to break at the points indicated by the dotted lines 16. Similarly the projection 13 is liable to break at its base 15. It is an object of our invention to prevent such breakage by an improved cross-sectional shape of the groove and of the projection engaging the same. The means whereby this object will be attained are illustrated in Figs. 2 to 11 which are illustrative of our invention.

In Fig. 2 we have shown members A2 and B2 of carbon, each having a rectangular cross-section and having means for connecting the two members A2 and B2 in aligned positions, the end face of one member being opposed to and, upon assembly, substantially abutting the end face of the other member. The means for interconnecting the two members comprise a transverse groove 214 provided in the end face 211 of the member B2 and a projection 213 provided on the end face 210 of the member A2, the cross-sectional profile of the groove and of the projection being the same throughout the length thereof. However, the projection 213 has its greatest width near its base, as indicated by the dotted line 215, and has its smallest width near its top. As a result, the electrode member B2 has a much larger cross-section at the points indicated by the dotted lines 216, and thus is less liable to breakage than the electrode B shown in Fig. 1.

Moreover, it will appear from Fig. 2 that the side faces of the projection 213 and of the groove 214 are formed with serrations 217 and 218 extending lengthwise, the profile of such serrations having a sawtooth shape. As a result, the projection 213 and the groove 214, when slidably engaged by relative motion of the two members A2 and B2 transversely of their axes, will firmly interlock whereby the joint thus provided through the members A2 and B2 will be able to transfer axial traction. At the same time the serrations will increase the area of contact provided between the two members A2 and B2 and will thus tend to increase the electrical conductivity. As appears from Fig. 2 the sawtooth profile of the serrations 217 and 218 is so shaped that the lateral sides of the serrations are undercut, whereby the joint is rendered capable of transferring tractional forces.

The embodiment of our invention shown in Fig. 3 is similar to that shown in Fig. 2, differing therefrom primarily by the profile of the lengthwise serrations 317 and 318 provided in the side faces of the projection 313 and of the groove 314 in that the serrations have an undulating profile and are sufficiently spaced from one another to permit the two members A3 and B3 to be joined by introduction of the projection 313 into the groove 314 in axial direction, a layer of cement indicated at 319 being interposed between the opposed faces thereof.

The embodiment of the present invention shown in Fig. 4 is similar to that shown in Fig. 3. The serrations, however, have a zigzag profile permitting insertion of the projection 413 into the groove 414 by axial engagement, an interposed layer of cement 419 forming the means of attachment.

In the embodiment shown in Fig. 5 the serrations provided in the side walls of the groove 514 are in registry with the serrations provided in the side wall of the projection 513, the space therebetween being filled with cement as shown at 519.

The cement used for the layers 319, 419 and 519 is preferably of a type having a satisfactory electrical conductivity.

In each of the embodiments of the present invention described hereinbefore, the projection provided on the end face of one of the two members and the complementary groove provided in the end face of the other member extend transversely the whole width of either member, i. e. from one side of the member to the opposite side thereof. In Figs. 6 and 7, however, a modified arrangement is illustrated in which the projection 613 provided on the end face 610 of the member A6 extends over part of the width of member A6 only. More particularly, the projection 613 extends from the side face 620 to the member A6 to a plane 621 which is located intermediate the side faces 620 and 622 of member A6 parallel thereto. Similarly, the complementary groove provided in the end face of member B6 extends but over part of the width of member B6. While the side faces of both, the projection 613 and the complementary groove 614, are shown as being smooth, they may be formed with lengthwise serrations, if desired.

Moreover, the embodiment shown in Figs. 6 and 7 differs from those shown in Figs. 2, 3, 4, and 5 by the provision of additional means preventing an accidental displacement of the projection or tooth 613 in the groove 614. For this purpose the electrode composed of the members A6 and B6 has a transverse bore 623 which intersects the bottom of the groove 614 and the tip of the projection 613. A pin 624 of carbon or any other suitable material is inserted in such bore.

Similarly, the electrodes illustrated in Figs. 2, 3, 4, and 5 may be provided with a transverse bore intersecting the bottom of the groove and the tip of the projection therein for the insertion of an interlocking pin. The pin will be inserted after the tooth 213 has been slipped into the groove 214 and will then prevent an accidental lateral displacement. The bore 623 will not materially weaken the cross-section of the electrode.

In Figs. 8 to 11 a battery of electrodes placed in a row is illustrated, the electrodes having a rectangular or a square cross-section. The end faces of the lower members B8 of each pair may be located within the same plane, as shown at 811 in Fig. 8, or they may be located in a staggered relationship, as shown at 911 in Fig. 9.

Where the members B8 have their end faces 811 arranged in alignment as shown in Fig. 8, the grooves 814 are likewise aligned, thus constituting, in effect, a single groove co-extensive with the whole length of the battery. The profile of the groove 814 may be that shown in either of the Figs. 2, 3, 4, or 5, transverse bores 823 being provided in the outer members B8 for the purpose described hereinabove with reference to the bore 623.

The staggered arrangement shown in Fig. 9 has the advantage that the weakest cross-sections of the various members B9 are located at different levels. Therefore, in each electrode member the cross-section subject to the greatest stress and thus jeopardized and likely to break is not located in the same plane with the corresponding cross-section of the other members. Moreover, with this arrangement the serrations 918 may constitute ridges tapering in width from one end to the other, the valleys located between the ridges tapering in the opposite direction. This wedge-like shape of the ridges and the valleys therebetween on the flanks of the grooves and projections of the electrode members have been joined by sliding the projections into the grooves, a firm fit being attained with the side faces of each pair of electrode members being in accurate registry.

The tapering serrations 917 on the projection 913 of member A9 and the complementary serrations 918 on the side faces of the groove 914 of member B9 is clearly visible in Figs. 10 and 11.

When the electrode members are arranged in a row to constitute a battery of electrodes, as shown in Fig. 8, the last member B8 in the row, for instance that shown at the left of Fig. 8, may be shaped as member B6 in Figs. 6 and 7, the groove therein extending over part of the width of the member only, thus provided for a firm stop limiting the relative sliding motion of the electrode members. If desired, in lieu of interlocking serrations 917 and 918, an interposed layer of cement may be used to connect the members A9 and B9, substantially as shown in Figs. 3, 4 and 5.

While we have described our invention by reference to a number of preferred embodiments thereof, we wish it to be clearly understood that our invention is not limited to the details of such embodiments but is capable of numerous modifications within the scope of the appended claims.

What we claim is:

1. Electrode connection, particularly for carbon and graphite electrodes for electrical ovens particularly of rectangular cross-section, comprising two complementary connecting elements having truncated-triangular shaped connecting surfaces when viewed in cross-section and provided with a plurality of alternate projections and depressions on the truncated-triangular faces of each, said projections and depressions extending from one side to the other along the truncated-triangular surfaces and said elements being connected to each other by laterally sliding the elements by means of the truncated-triangular surfaces one relative to the other by the projections and depressions so that the elements are connected by relative lateral movement parallel to each other.

2. Electrode connection according to claim 1, in which the projections and depressions are in the form of step-shaped surfaces.

3. Electrode connection according to claim 1, in which the projections and depressions are in the form of step-shaped surfaces as saw-teeth when viewed in plan.

4. Electrode connection according to claim 1, in which the projections and depressions are in the form of serrations which grip into each other.

FRIEDRICH LEUCHS.
HANS ZÖLLNER.

References Cited in the file of this patent

UNITED STATES PATENTS

| Number | Name | Date |
|---|---|---|
| 863,674 | Tone | Aug. 20, 1907 |
| 881,519 | Wilson | Mar. 10, 1908 |
| 881,520 | Wilson | Mar. 10, 1908 |
| 922,917 | Landis | May 25, 1909 |
| 1,007,151 | Speiden | Oct. 31, 1911 |
| 1,032,250 | Speiden | July 9, 1912 |
| 1,032,514 | Smith | July 16, 1912 |
| 1,785,587 | Kuhlmann | Dec. 16, 1930 |
| 2,527,294 | Bailey | Oct. 24, 1950 |

FOREIGN PATENTS

| Number | Country | Date |
|---|---|---|
| 472,856 | France | Aug. 21, 1914 |
| 480,802 | France | July 4, 1916 |